INVENTORS
Edward H. Warwick
Carl F. Wood
BY
Donald P. Selvecki
THEIR ATTORNEY

INVENTORS
Edward H. Warwick
Carl F. Wood
BY
Donald P. Selvicki
THEIR ATTORNEY

United States Patent Office 3,342,291
Patented Sept. 19, 1967

3,342,291
MANUALLY ACTUATED SPOT-TYPE DISC
BRAKE AND ADJUSTING MEANS
Edward H. Warwick, Englewood, and Carl F. Wood, Dayton, Ohio, assignors to General Motors Corporation, Detroit, Mich., a corporation of Delaware
Filed June 28, 1965, Ser. No. 467,450
4 Claims. (Cl. 188—73)

This invention relates to disc brake mechanisms and more particularly to a parking brake arrangment for use with disc brakes.

The use of caliper type disc brakes on a vehicle creates the need for a parking brake arrangement which utilizes disc braking apparatus of common design without interfering with the efficiency of the disc brake while being mechanically actuable from the driving compartment of a vehicle.

It is an object of the present invention to provide an improved parking brake mechanism for use with caliper-type disc brakes.

It is another object of the present invention to provide an improved parking brake mechanism which utilizes a disc brake mechanism without taking away in any fashion from the efficiency of the disc brake.

It is still another object of the present invention to provide an improved parking brake for use with disc brakes which provides a balanced force against both sides of a rotatable disc.

It is a further object of the present invention to provide an improved parking brake arrangement for use with caliper-type disc brakes that automatically compensates for pad wear, thereby requiring as much movement for actuation when a pad is worn as when a pad is new.

Further objects and advantages of the present invention will be apparent from the following description, reference being had to the accompanying drawings wherein a preferred embodiment of the present invention is clearly shown.

Figure 1:
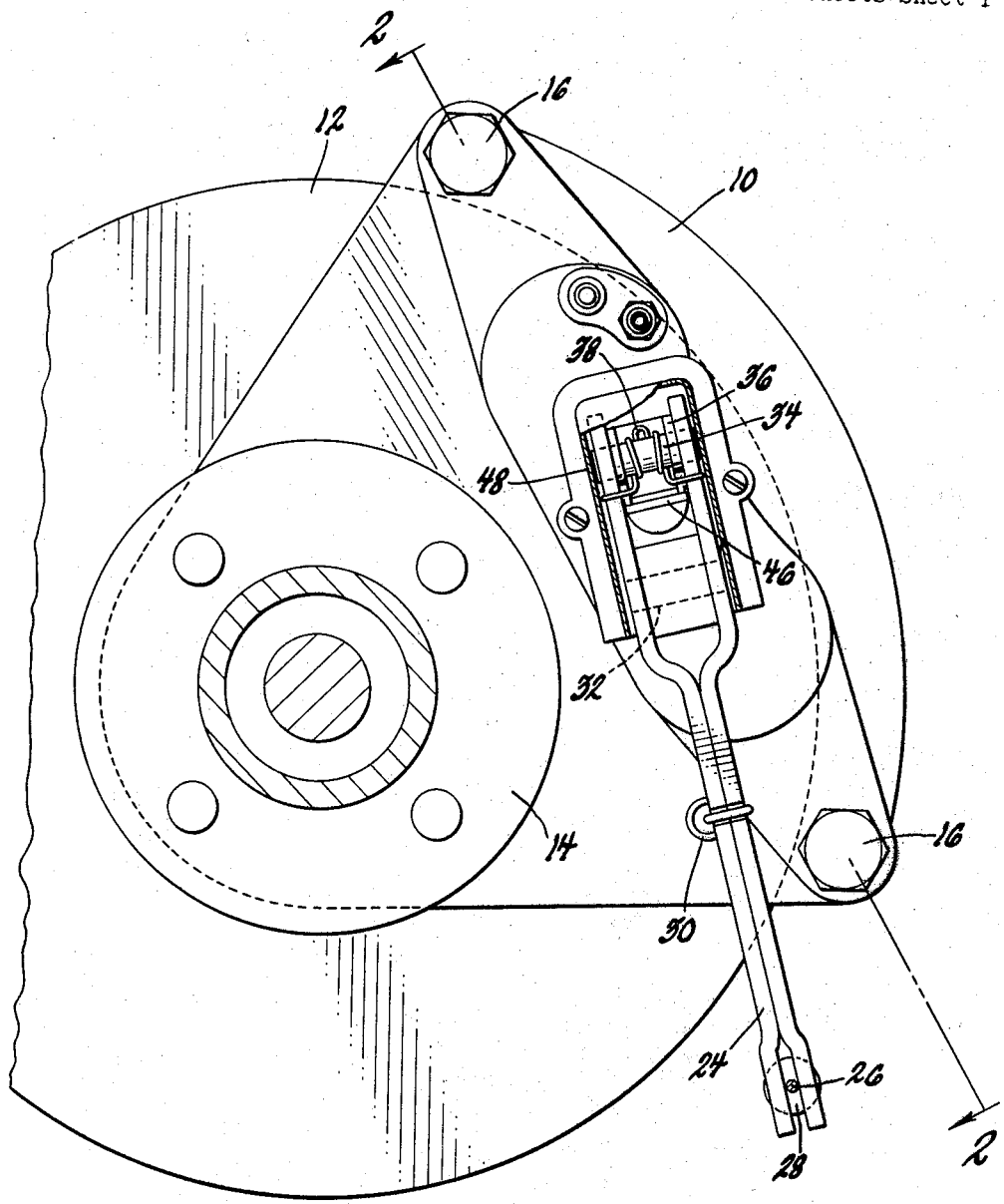
FIGURE 1 is an elevational view of the subject invention illustrated in its operative environment.

Referring to FIGURE 1, a caliper-type housing 10 is illustrated in its operative position relative to a disc 12. Disc 12 is rotatable with a vehicle wheel while housing 10 is carried by a non-rotatable hub 14.

Figure 2:
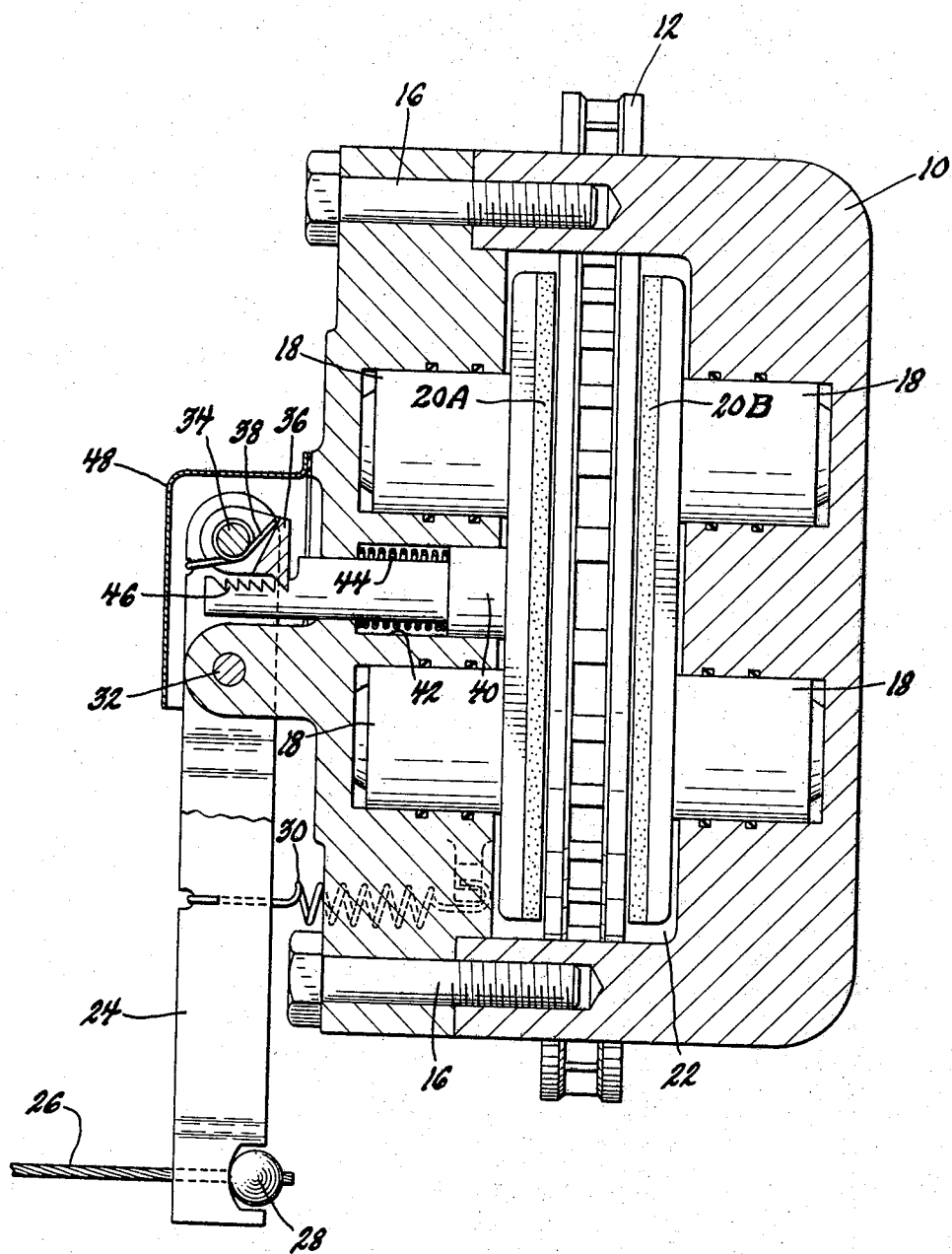
FIGURE 2 is a sectional view taken along line 2—2 of FIGURE 1.

Referring now to FIGURE 2, disc 12 is seen passing through housing 10 which is shown in section. Housing 10 is generally composed of two portions fastened together by means of bolts 16. It is understood that, in a given instalation, housing 10 could be a unitary member. Power pistons 18 are responsive for translational movement by hydraulic pressure supplied in any well-known manner and drivably engage friction pad 20A which is selectively driven into surface contact with rotatable disc 12 to impede the rotation thereof and provide braking therefor. Pads 20A and 20B are typically located in recessed portions 22 of housing 10.

Lever 24 is engaged at a lower end by cable 26 with a ball retainer 28 cradled in a portion of lever 24. Spring 30 engages the housing on its one end and the lever on its other end to maintain cable 26 taut. Lever 24 is pivoted around pin 32 carried by a portion of housing 10. The upper end of lever 24 carries a pin 34 around which pawl 36 is rotatable. Spring 38 engages lever 24 and constantly urges pawl 36 in a clockwise manner around pin 34. Slide 40 is movable in bore 42 formed in housing 10 and engages pad 20A. Spring 44 urges slide 40 into engagement with pad 20A. A toothed portion or rack 46 of slide 40 engages pawl 36 at a selected point and is the driving link between lever 24 and slide 40. Cover 48 is carried by housing 10 and covers pawl 36, the toothed portion 46 and pin 32 to prevent foreign matter from interfering with the workings thereof. Cover 48 can also serve to retain pins 32 and 34 in their operative position.

In operation, when it is desired to apply a parking brake to disc 12, cable 26 is drawn away from housing 10 by a lever or pedal suitably placed in the driving compartment of the vehicle. Lever 24 pivots in a clockwise manner around pin 32 causing pawl 36 to drive slide 40 against pad 20A. Reaction force against pin 32 causes housing 10 to push pad 20B against disc 12. The ultimate result is a scissor-like action between pad 20B pushed toward the disc by housing 10 and pad 20A pushed toward an opposite side of the disc by slide 40. Disc 12 is thereby made non-rotatable with respect to housing 10. The parking brake is set in the driving compartment in any well-known manner. A release is effected by relieving the force from lever 24 so that spring 30 draws lever 24 around pin 32 toward housing 10. Housing 10 moves toward its normal position, thereby freeing pads 20A and 20B from disc 12 and allowing relative movement thereafter therebetween. It should be noted that the movement of housing 10 and the pads 20A and 20B is very subtle in that normal clearance between disc 12 and the pads 20A and 20B is on the order of .010 to .015 of an inch.

The operation of the subject device is very similar and the amount of movement of lever 24 does not appreciably vary as wear occurs on pads 20A and 20B. This is accomplished by an automatic adjustment taking place between pawl 36 and the toothed portion 46 of slide 40. If the movement of slide 40 during a brake actuation causes slide 40 to travel a distance more than the spacing between the teeth on toothed portion 46, the return motion of lever 24 brought about by spring 30 will cause pawl 36 to engage an adjacent tooth, thereby leaving slide 40 against pad 20A. It is understood that spring 44 constantly urges slide 40 against pad 20A. In this manner, an automatic adjusting takes place and the movement of lever 24 during a brake actuation is maintained at approximately the same magnitude throughout the life of pads 20A and 20B.

The utility of the subject device is particularly apparent when used with a disc brake of the type described because the parking brake mechanism requires very few additional pads and utilizes the same surface contacting means utilized during conventional disc braking. In addition, unlike conventional parking brakes, the subject invention makes possible the application of force to both sides of disc 12 in the same manner as the force is exerted during conventional hydraulic powered braking. Therefore, the tolerances set up for conventional braking are the same as those utilized with the subject invention, thereby readily adapting the subject invention for use as an emergency brake. The length of lever 24 will control the amount of mechanical advantage gained for mechanical brake actuation and this can be varied as determined by vehicle weight and other design considerations.

While the embodiment of the present invention, as herein disclosed, constitutes a preferred form, it is to be understood that other forms might be adopted.

What is claimed is as follows:

1. A caliper-type disc brake mechanism including a housing, disc, and friction pads therefor, said mechanism comprising: a lever pivotally supported at a fulcrum point disposed between extremities thereof on one side of the housing; pawl means carried by said lever and pivotal near one extremity of said lever and being spring loaded in one direction of rotation; a slide linearly movable in a wall of the housing and engaging one of said friction pads for the disc brake, said slide having a flat rack portion arranged to cooperate with said pawl means to establish a poised position for said slide as pad wear progresses; biasing means engaging said lever; and a cable engaging said lever and being movable from the driving compartment of a vehicle to pivot said lever against the force of said biasing means to force said slide toward the disc and drawing a portion of the housing toward the moving slide to engage the disc on opposite sides in scissor-like action to impede relative movement between the housing and the disc, said pawl means moving across said flat rack portion during brake release to engage a new tooth thereof if brake wear has progressed to the point requiring an adjustment.

2. A caliper-type disc brake mechanism according to claim 1 wherein said biasing means maintains said cable taut throughout the working range of said pivotable lever.

3. A caliper-type disc brake adjusting mechanism comprising; a housing; an actuator lever pivotally supported on said housing and being pivotable in response to axial movement induced in a cable connected to one end thereof from the driving compartment of a vehicle; spring means for biasing said lever means toward the housing keeping the cable taut and providing a poised position for operation of said mechanism; drive means slidable in said housing toward friction pads arranged to provide a braking action, said drive means having a rack surface on a flat portion formed near one extremity thereof in proximity to said actuator lever; and a pawl pivotably supported near an end of said actuator means and including a portion engaging the rack surface of said drive means, said pawl being spring biased toward said rack surface so that pivotal movement of said actuator lever causes the pawl to drive said drive means in the direction of friction pads to provide a braking action, said pawl being movable relative to said rack surface to provide an automatic adjusting means for said drive means by engaging a new tooth on said rack surface if the return movement of the actuator lever is sufficient to require a brake adjustment.

4. Adjusting mechanism according to claim 3 wherein said drive means is a piston biased toward the disc and includes a toothed portion at one end thereof cooperating with said lock means.

References Cited

UNITED STATES PATENTS

| | | | |
|---|---|---|---|
| 1,783,827 | 12/1930 | Carr | 254—108 |
| 1,793,470 | 2/1931 | Enderby | 188—79.5 |
| 1,877,385 | 9/1932 | Casaletto | 188—196 X |
| 2,691,211 | 10/1954 | Leiber | 254—108 X |
| 3,129,789 | 4/1964 | Hodkinson | 188—79.5 X |
| 3,233,705 | 2/1966 | Knapp | 188—106 X |
| 3,244,260 | 4/1966 | Frayer | 188—72 X |

FOREIGN PATENTS

| | | |
|---|---|---|
| 1,345,151 | 10/1963 | France. |
| 984,436 | 2/1965 | Great Britain. |
| 356,027 | 9/1961 | Switzerland. |

MILTON BUCHLER, *Primary Examiner.*

G. E. HALVOSA, *Assistant Examiner.*

UNITED STATES PATENT OFFICE

CERTIFICATE OF CORRECTION

Patent No. 3,342,291 September 19, 1967

Edward H. Warwick et al.

It is hereby certified that error appears in the above numbered patent requiring correction and that the said Letters Patent should read as corrected below.

Column 1, line 17, for "actuable" read -- actuatable --; column 2, line 48, for "pads" read -- parts --.

Signed and sealed this 3rd day of December 1968.

(SEAL)
Attest:

Edward M. Fletcher, Jr.

Attesting Officer

EDWARD J. BRENNER

Commissioner of Patents